(12) United States Patent
Yang et al.

(10) Patent No.: US 9,025,673 B2
(45) Date of Patent: May 5, 2015

(54) TEMPORAL QUALITY METRIC FOR VIDEO CODING

(75) Inventors: Kai-Chieh Yang, San Diego, CA (US); Khaled Helmi El-Maleh, San Diego, CA (US); Vijay Mahadevan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2118 days.

(21) Appl. No.: 11/450,692

(22) Filed: Jun. 8, 2006

(65) Prior Publication Data
US 2007/0237227 A1    Oct. 11, 2007

(51) Int. Cl.
| | |
|---|---|
| H04N 7/12 | (2006.01) |
| H04N 11/02 | (2006.01) |
| H04N 11/04 | (2006.01) |
| H04N 17/00 | (2006.01) |
| H04N 19/172 | (2014.01) |
| H04N 19/61 | (2014.01) |
| H04N 19/132 | (2014.01) |

(Continued)

(52) U.S. Cl.
CPC .............. *H04N 17/004* (2013.01); *H04N 5/144* (2013.01); *H04N 5/147* (2013.01); *H04N 19/172* (2014.11); *H04N 19/61* (2014.11); *H04N 19/132* (2014.11); *H04N 19/146* (2014.11); *H04N 19/587* (2014.11)

(58) Field of Classification Search
CPC . H04N 17/004; H04N 19/132; H04N 19/146; H04N 19/172; H04N 5/144; H04N 5/147
See application file for complete search history.

(56) References Cited

U.S. PATENT DOCUMENTS 5,550,595 A  *  8/1996  Hannah ......................... 348/552
5,614,945 A     3/1997  Sekine et al.

(Continued)

FOREIGN PATENT DOCUMENTS

EP    0649256 A2    4/1995
EP    0888019 A1    12/1998

(Continued)

OTHER PUBLICATIONS

Patrana-Vidal Ricardo R et al., "Sporadic Frame Dropping Impact on Quality Perception," Proceedings of the SPIE, USA, vol. 5292, No. 1, 2004, pp. 182-193.

(Continued)

*Primary Examiner* — Nhon Diep
(74) *Attorney, Agent, or Firm* — Alex C. Chen; Elaine H. Lo

(57) ABSTRACT

The disclosure is directed to techniques for evaluating temporal quality of encoded video. Instead of estimating jerkiness based solely on frame rate or motion activity, the number of consecutive dropped frames forms a basic estimation unit. Several human visual system factors, such as sensitivity to temporal quality fluctuation and motion activity, have been taken into account to make the predicted jerkiness more consistent with the actual human visual response. The temporal quality metric can be used to estimate human perceived discomfort that is introduced by temporal discontinuity under various combinations of video shots, motion activity and local quality fluctuations. The techniques can be applied in two modes: (1) bitstream or (2) pixel mode. The quality metric can be used to evaluate temporal quality, or to control encoding or decoding characteristics to enhance temporal quality.

29 Claims, 8 Drawing Sheets

(51) Int. Cl.
  *H04N 19/146* (2014.01)
  *H04N 19/587* (2014.01)
  *H04N 5/14* (2006.01)

(56) References Cited

U.S. PATENT DOCUMENTS

| | | | |
|---|---|---|---|
| 6,795,504 | B1 | 9/2004 | Xu et al. |
| 7,030,845 | B2 * | 4/2006 | Maa ............................. 345/88 |
| 2002/0136298 | A1 * | 9/2002 | Anantharamu et al. . 375/240.12 |
| 2003/0140346 | A1 * | 7/2003 | Maa ............................. 725/87 |
| 2003/0160945 | A1 | 8/2003 | Honda |
| 2008/0130737 | A1 * | 6/2008 | Kamariotis et al. ..... 375/240.01 |

FOREIGN PATENT DOCUMENTS

| | | |
|---|---|---|
| JP | 7115584 A | 5/1995 |
| JP | 2000165857 A | 6/2000 |
| JP | 2003250155 A | 9/2003 |
| JP | 2007019802 A | 1/2007 |
| WO | WO2004075560 A1 | 9/2004 |

OTHER PUBLICATIONS

Iacovoni G et al, "Quality-Temporal Transcoder Driven by the Jerkiness," Multimedia and Expo, 2005. ICME 2005. IEEE International Conference on Amsterdam, Piscataway, NJ, USA, IEEE, Jul. 6, 2005, pp. 1452-1455.

PCT Search Report, Sep. 5, 2007.

Kai-Chieh Yang et al. 'Perceptual Temporal Quality Metricfor Compressed Video', Multimedia, IEEE Transaction on vol. 9, Issue: 7 2007, pp. 1528-1535.

S. Conversy and J-D. Fekete: "The svgl toolkit: enabling fast rendering of rich 2D graphics" Technical Report—Ecole Des Mines De Nantes, No. 02/01/info, 2002, pp. 1-11, XP002539626 France.

Written Opinion—PCT/US2007/066082, International Search Authority, European Patent Office, May 9, 2007.

* cited by examiner

TEMPORAL QUALITY METRIC FOR VIDEO CODING

This application claims priority and the benefit of co-assigned U.S. Provisional Application No. 60/789,664, filed Apr. 5, 2006, the entire content of which is incorporated herein by reference.

TECHNICAL FIELD

The disclosure relates to digital video encoding and, more particularly, techniques for evaluating quality of encoded video.

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard. These video encoding standards generally support improved transmission efficiency of video sequences by encoding data in a compressed manner.

Video telephony (VT), as an example, permits users to share video and audio information to support applications such as videoconferencing. Exemplary video telephony standards include those defined by the Session Initiation Protocol (SIP), the ITU H.323 standard, and the ITU H.324 standard. In a VT system, users may send and receive video information, only receive video information, or only send video information. A recipient generally views received video information in the form in which it is transmitted from a sender.

Encoded video can suffer from temporal quality degradation due to frame dropping. Frame dropping can result from a variety of factors such as frame skipping, frame rate down-sampling and channel packet losses. In general, frame skipping tends to have a greater impact on temporal quality degradation than frame rate down-sampling or channel packet losses. In the case of substantial frame dropping, the viewer may observe frame freezing because most video decoders automatically duplicate the last frame received before a dropped frame, and present the duplicate frame in place of the dropped frame while maintaining the same frame rate.

The duplication associated with frame dropping causes a temporal discontinuity often referred to as "jerkiness." Jerkiness tends to be disconcerting to a viewer of the decoded video. In viewing a jerky video sequence, the viewer experiences discomfort not only due to the amount of dropped frames, but also due to the temporal quality fluctuation between dropped and non-dropped frames. The human visual system tends to have a very high sensitivity to the quality contrast of the current frame to its neighboring frames.

SUMMARY

The disclosure is directed to techniques for evaluating temporal quality of encoded video. Instead of estimating temporal quality based solely on frame rate or motion activity, the disclosed temporal quality metric uses the number of consecutive dropped frames as a basic estimation unit. The number of consecutive dropped frames is referred to herein as the frame group dropping length. In addition, several human visual system factors, such as sensitivity to temporal quality fluctuation or motion activity, may be taken into account to make the predicted temporal quality more consistent with the actual human visual response.

The temporal quality metric may be referred to as just noticeable jerkiness (JNJ) in that it emphasizes temporal quality degradation that can be perceived by the human viewer, i.e., only noticeable jerkiness. This JNJ metric can be used to effectively estimate human perceived discomfort that is introduced by temporal discontinuity perkiness) under various combinations of video shots, video motion activity and local quality fluctuations. The described techniques may be applied in two modes: (1) bitstream or (2) pixel mode, based on the availability of input information. The temporal quality metric may be used to simply evaluate temporal quality, or to produce feedback for control of encoding or decoding characteristics to enhance temporal quality in the event temporal quality has been significantly degraded due to frame dropping.

In one embodiment, the disclosure provides a method comprising generating a temporal quality metric for a video sequence based on a number of consecutive dropped video frames in the video sequence.

In another embodiment, the disclosure provides a device comprising a processor that generates a temporal quality evaluation for a video sequence based on a number of consecutive dropped video frames in the video sequence.

The techniques described herein may be implemented in hardware, software, firmware, or any combination thereof. If implemented in software, the techniques may be realized in whole or in part by a computer-readable medium comprising program code containing instructions that, when executed, perform one or more of the methods described in this disclosure.

The details of one or more embodiments are set forth in the accompanying drawings and the description below. Other features, objects, and advantages will be apparent from the description and drawings, and from the claims.

BRIEF DESCRIPTION OF DRAWINGS

The patent or application file contains at least one drawing executed in color. Copies of this patent or patent application publication with color drawings(s) will be provided by the Office upon request and payment of the necessary fee.

DETAILED DESCRIPTION

Figure 1:
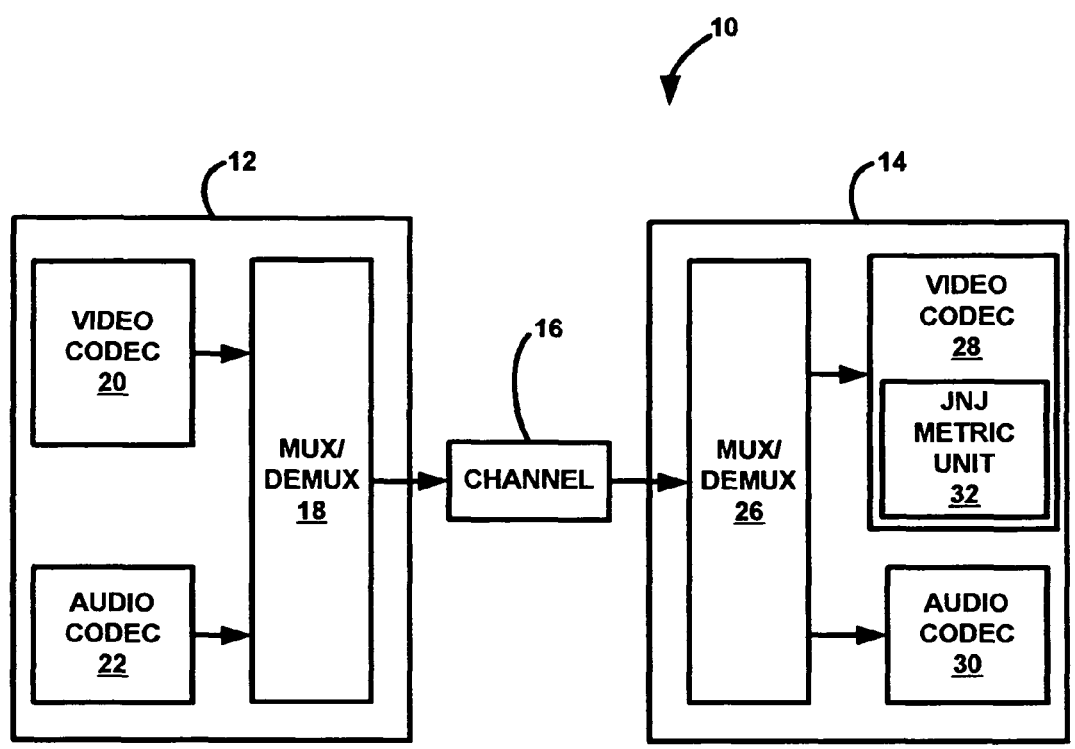
FIG. 1 is a block diagram illustrating a video encoding and decoding system equipped with a just noticeable jerkiness (JNJ) metric unit, in accordance with this disclosure.

FIG. 1 is a block diagram illustrating a video encoding and decoding system 10 incorporating a JNJ metric unit 32. In accordance with an embodiment of this disclosure, the metric calculation may emphasize temporal quality degradation perceived by a user over temporal quality degradation that cannot be perceived by a user. In some embodiments, the metric considers only temporal quality degradation, e.g., jerkiness, that can actually be perceived by a human viewer, and may be referred to as a JNJ metric.

JNJ metric unit 32 may be configured to disregard small amounts of temporal discontinuity that are not readily perceived by the user, or at least weight the metric so that such small amounts of temporal discontinuity have little effect on the overall metric. Rather, the JNJ metric is formulated to emphasize only temporal quality degradation that can be perceived by the human viewer, i.e., just (only) noticeable jerkiness.

As shown in FIG. 1, system 10 includes a first video communication device 12 and a second video communication device 14. Communication devices 12, 14 are connected by a transmission channel 16. Transmission channel 16 may be a wired or wireless communication medium. System 10 may support two-way video transmission between video communication devices 12, 14 for video telephony, one-way video transmission for video streaming, or both. Devices 12, 14 may operate in a substantially symmetrical manner. In some embodiments, however, one or both video communication devices 12, 14 may be configured for only one-way communication to support video streaming.

For two-way applications, reciprocal encoding, decoding, multiplexing (MUX) and demultiplexing (DEMUX) components may be provided on opposite ends of channel 16. In the example of FIG. 1, video communication device 12 includes MUX/DEMUX component 18, video CODEC 20 and audio CODEC 22. Similarly, video communication device 14 includes MUX/DEMUX component 26, video CODEC 28 and audio CODEC 30.

One or both of video communication devices 12, 14 may be configured to apply techniques for temporal quality estimation. In some embodiments, video communication devices 12, 14 may actively apply frame skipping and/or frame rate down-sampling on a fixed or adaptive basis to compensate for coding rate, frame rate, or other bandwidth limitations. In addition, frames may be dropped during transmission over channel 16, due to factors such as data corruption or short term channel loss.

In each case, frame dropping can result in temporal quality degradation, including visible temporal discontinuity sometimes referred to as jerkiness. In accordance with this disclosure, one or both video CODECs 20, 28 may include a JNJ metric unit. In the example of FIG. 1, video CODEC 28 includes a JNJ metric unit 32 that evaluates temporal quality. JNJ metric unit 32 may simply generate a JNJ metric for evaluation, or provide the JNJ metric to other components within video CODEC 28, e.g., for control of video decoding or signaling to a different video communication device.

For example, video CODEC 28 may adjust one or more decoding characteristics based on the JNJ metric to improve temporal quality. Video CODEC 28 may adjust decoding characteristics periodically on a dynamic basis in response to changes in the JNJ metric. Alternatively, or additionally, video CODEC 28 may generate signaling information based on the JNJ metric, and communicate the signaling information to video communication device 12 either in-band or out-of-band so that video CODEC 20 can adjust encoding characteristics to improve temporal quality. As a further illustration, the JNJ metric, or one or more control signals generated based on the JNJ metric, may be used as feedback to control adaptive frame skipping processes within video communication device 12.

System 10 may support video telephony according to the Session Initiated Protocol (SIP), ITU H.323 standard, ITU H.324 standard, or other standards. Each video CODEC 20, 28 may generate encoded video data according to a video compression standard, such as MPEG-2, MPEG-4, ITU H.263, or ITU H.264. As further shown in FIG. 1, video CODECs 20, 28 may be integrated with respective audio CODECs 22, 30, and include appropriate MUX/DEMUX components 18, 26 to handle audio and video portions of a data stream. The MUX-DEMUX units 18, 26 may conform to the ITU H.223 multiplexer protocol, or other protocols such as the user datagram protocol (UDP).

Video communication devices 12, 14 may be implemented as wireless mobile terminals or wired terminals equipped for video streaming, video telephony, or both. To that end, video communication devices 12, 14 may further include appropriate wireless transmitter, receiver, modem, and processing electronics to support wireless communication. Examples of wireless mobile terminals include mobile radio telephones, mobile personal digital assistants (PDAs), mobile computers, mobile televisions, or any other mobile devices equipped with wireless communication capabilities and video encoding and/or decoding capabilities. Examples of wired terminals include desktop computers, workstations, video telephones, network appliances, set-top boxes, interactive televisions, or the like. Either video communication device 12, 14 may be configured to send video information, receive video information, or send and receive video information.

For video telephony applications, it is generally desirable that devices 12 support both video send and video receive capabilities. However, streaming video applications are also contemplated. In video telephony, and particularly mobile video telephony by wireless communication, bandwidth is a significant concern as extremely low bitrates are often required. In particular, communication channel 16 may have limited bandwidth, making the effective real-time transmission of quality video sequences over channel 16 very challenging. Communication channel 16, for example, may be a wireless communication link with limited bandwidth due to physical constraints in channel 16, or possibly quality-of-service (QoS) limitations or bandwidth allocation constraints imposed by the provider of communication channel 16.

In general, system 10 employs techniques for evaluating temporal quality to generate a temporal quality metric for video telephony (VT) applications. The temporal quality metric represents a degree of jerkiness as perceived by a human viewer. Instead of estimating jerkiness according to frame rate alone, the temporal quality metric described in this disclosure uses the length of group-dropping as the basic estimation unit. The length of group dropping refers to the number of consecutively dropped frames within a video sequence.

In addition, the temporal quality metric uses human visual system factors, such as sensitivity to temporal quality fluctuation and motion activity, to make the predicted jerkiness more consistent with subjective visual response. In particular, the temporal quality fluctuation and motion activity sensitivities may be selected to be more consistent with Mean Opinion Score (MOS) data from subjective experiments. Test results show that a JNJ metric, as described in this disclosure, can effectively measure the human perceived jerkiness and produce outputs that are highly correlated with subjective experimental results.

In video temporal quality degradation, jerkiness is a dominant artifact. Jerkiness is usually caused by (1) frame skipping while encoding, (2) frame rate down-sampling and/or (3) channel packet losses. The above causes (1)-(3) of temporal quality degradation are listed in order of severity of impact on temporal quality degradation. As frame dropping occurs, e.g., to conserve encoding bits or stay within a bandwidth capacity limit, the viewer will observe frame freezing. Typical video decoders automatically duplicate the last frame before frame dropping occurred, and substitute the duplicated frame for the dropped frame, while maintaining the same video playback speed. Unfortunately, this results in frame freezing and temporal discontinuity when a new frame is displayed, causing the so-called "jerkiness."

In order to reduce the negative impact of frame dropping for viewers, several methods have been investigated. For example, techniques for smart frame dropping or frame rate up conversion have been developed. Without accurate guidance that is oriented to human perception, however, video enhancement by smart frame dropping or frame rate up conversion is difficult to apply effectively. Some proposed metrics estimate jerkiness based on frame rate information or motion activity. Many practical observations show that estimating jerkiness based on frame rate is insufficient because it assumes that dropped frames are evenly distributed throughout an entire video sequence.

With the same frame rate, dropping a group of consecutive frames has a markedly different quality impact relative to sparse frame dropping. Group dropping refers to the dropping of two or more, and possibly several, consecutive frames. Sparse frame dropping generally refers to dropping of one or two frames at different positions within the video sequence. The inherent cognitive interpolative mechanism of humans cause very different responses to group frame dropping versus sparse frame dropping.

In addition, estimating jerkiness based on frame rate information assumes that the non-dropped frames do not introduce any negative impact. In a jerky sequence, however, the discomfort to the viewer is caused not only by the amount of dropped frames, but also due to temporal quality fluctuation between dropped and non-dropped frames. The human visual system has very high sensitivity to the quality contrast between the current frame and its neighboring frames.

Some jerkiness metrics may estimate the amount or duration of frame-loss and duplication by using time stamp information from the video bitstream or by analyzing the degree of similarity between consecutive frames. When frame loss/drop occurs, the discontinuity in the time stamps is obvious and the inter-frame similarity is extremely high. After obtaining the location and number of dropped frames, the average frame rate can be estimated by dividing the number of total dropped frames by the total number of frames in a given bitstream/video clip.

Because the same frame rate can introduce different levels of jerkiness under different motion activities, a mapping function, with motion activity as its input, maps the frame rate into the jerkiness measure. In order to estimate the jerkiness more comprehensively, post-processing may be applied after the mapping stage with statistical analysis of the distribution of dropping duration. However, such schemes do not consider the impact of local temporal quality fluctuation, which can have a significant impact on the human visual response.

In accordance with this disclosure, the JNJ metric accurately estimates the human perceived visual discomfort that is introduced by temporal discontinuity (jerkiness) under various combinations of shots, different video motion activity and, importantly, different local quality fluctuations. In this manner, the temporal quality metric considers the variation of local jerkiness as one of the factors used to estimate jerkiness, which is important for temporal quality assessment. In addition, JNJ metric 32 may be configured to disregard or devalue temporal quality degradation that is not noticeable to a human viewer.

JNJ metric unit 32 is configured to estimate jerkiness not only by using the frame rate but by utilizing the length of group-frame dropping. Based on the information of the length of group-dropping, more important attributes of temporal quality assessment can be analyzed. Further, the JNJ metric may be implemented in two different modes. In one mode, the video bitstream may be evaluated. In another mode, the pixel information may be evaluated, if sufficient input information is available. Hence, in some embodiments, a system implementing the JNJ metric evaluation may support two different types of input information, providing significant flexibility.

Figure 2:
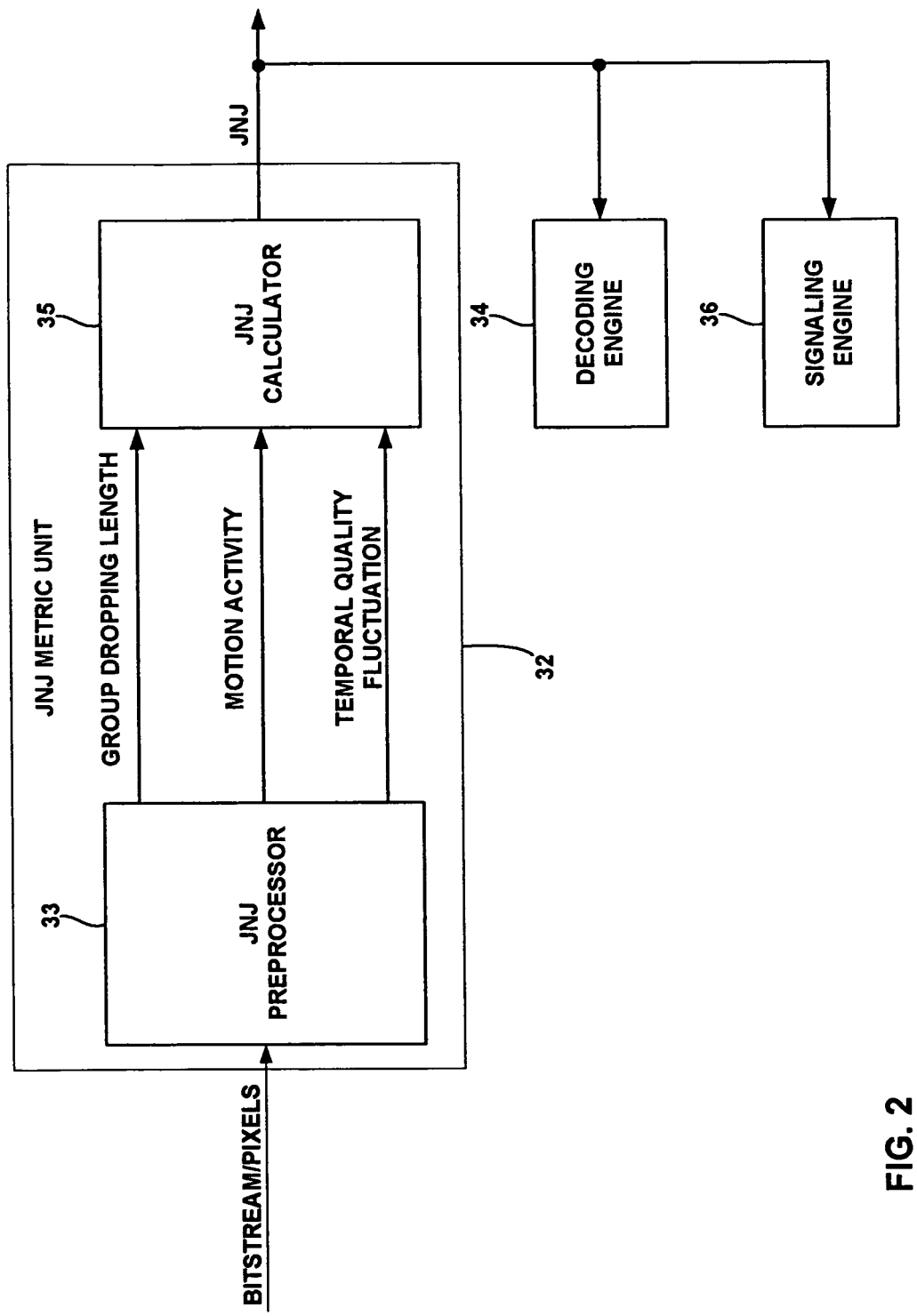
FIG. 2 is a block diagram illustrating operation of the JNJ metric unit of FIG. 1.

FIG. 2 is a block diagram illustrating operation of the temporal quality (JNJ) metric unit of FIG. 1. As shown in FIG. 2, just noticeable jerkiness (JNJ) unit 32 includes a JNJ preprocessor 33 that receives either video bitstream or pixel information. JNJ preprocessor 33 processes the received video information to produce several parameters used by a JNJ calculator 35 to produce the JNJ metric. In particular, JNJ preprocessor 33 estimates group dropping length information, motion activity information, and temporal quality fluctuation (TQF) information. The group dropping length information indicates the number of consecutively dropped frames within a video sequence, or within a particular shot within a video sequence. The motion activity information generally indicates whether the content of the video sequence represents a low, medium, or high degree of motion. The TQF information indicates the temporal quality contrast between a current frame under evaluation and its neighboring frames, i.e., frames preceding and following the current frame.

Using the group dropping length, motion activity, and TQF information, JNJ calculator 35 calculates the JNJ metric, which represents jerkiness. JNJ calculator 35 may simply generate and store the jerkiness for further analysis. Additionally, or alternatively, JNJ metric unit 32 may provide the temporal quality information, or feedback or control information based on the JNJ metric, to a decoding engine 34 or signaling engine 36 within video CODEC 14. Decoding engine 34 may make changes to one or more decoding characteristics based on the JNJ metric to enhance temporal quality. Signaling engine 36 may generate signaling information for transmission to a device that encodes the video information so that it may adjust one or more encoding characteristics to enhance temporal quality.

As will be described, in the bitstream mode, JNJ metric unit 32 may use time stamp information from the input video bitstream to determine whether frame dropping has occurred. If the time stamps for consecutive frames show a gap, it is evident that at least one intervening frame has been dropped, e.g., by frame skipping, frame rate down-sampling, or channel loss. The length of the gap, as determined by the time stamps, permits determination of the number of consecutive frames that have been dropped, i.e., the group dropping length.

For example, the time stamps for consecutively encoded frames may increase in a unit step. If two frames having different content show more than one unit step between them, however, it is apparent that at least one frame has been dropped. By dividing the time stamp difference by the unit step, it is possible to determine how many frames have been dropped. Alternatively, the number of dropped frames may be determined by counting the number of times a particular time stamp is repeated.

JNJ metric unit 32 may use coding mode decision information (e.g., Intra or Inter) from the input bitstream to determine a shot boundary. A shot boundary refers to the video shot boundary between video frames obtained for different scenes. One shot includes one or more video frames obtained for a first scene, while a second shot may include one or more video frames obtained for a second scene and so forth.

The shots may be different in terms of the captured subject matter, video capture conditions such as illuminant conditions, or other differences. For example, one shot may contain a first person in a first setting, such as a sports spectator sitting relatively still in a seat, which presents low motion activity, while a second shot may contain another person or persons on a playing field engaged in high motion activity.

Shot boundary detection is desirable for motion activity estimation because video sequences with similar content usually have similar motion activity. In order to accurately estimate the jerkiness, the "correct" level of motion activity should be estimated. Therefore, different levels of motion activity can be distinguished by distinguishing shots from one another. Shot boundary detection is also desirable so that motion activity caused by a scene change can be eliminated from consideration in the temporal quality metric because it does not actually contribute to jerkiness.

JNJ metric unit 32, in an example embodiment, applies a motion-mapping model that uses a frame rate based frame dropping severity. One of the inputs of the motion-mapping model is an estimate of the motion activity level. The estimate of the motion activity level is obtained by the average magnitude of motion vectors in each frame. After applying the motion mapping model, a frame rate-based estimation of dropping severity is available for each frame.

Because humans are very sensitive to an abrupt change in quality, the temporal quality degradation of each frame is not related to the current frame only, but also to its neighboring frames. Higher contrast in temporal quality degradation between a current frame and neighboring frames will be more noticeable to a viewer. For these reasons, temporal degradation of a frame with high fluctuation compared with neighboring frames should be more heavily weighted in evaluating temporal quality.

Video playback is a causal process. Consequently, viewer sensitivity to quality fluctuation of a current frame may only be related to previously viewed video frames. Therefore, JNJ metric unit 32 estimates weights using a temporal quality fluctuation (TQF) function that looks backwards at frames within a window defined by a fixed window size. In general, the dropping severity obtained from motion mapping, $s'_{m,n}$, is applied to the temporal quality fluctuation (TQF) function to estimate temporal quality fluctuation. More particularly, the TQF estimate can be determined by the square of the difference between $s'_{m,n}$ and the mean of its neighboring drop severity.

A square of the difference is used because the human visual system has a non-linear visual sensitivity when the size of group-dropping is increased. Then, because the possible fluctuation of the upper/lower bound of each frame rate is variable, the temporal quality fluctuation should be normalized into values of 0-1 using a lookup table (LUT). Next, as will be described in further detail, JNJ metric unit 32 applies a non-linear TQF function, a normalization parameter k, drop severity and motion modeling in a temporal fusion unit to produce the jerkiness report for use in analysis, video decoding control, or video encoding control via signaling.

In general, the TQF response rises rapidly after some point and quickly becomes saturated. Human sensitivity increases when small amounts of temporal quality fluctuation appear in viewed video, and quickly saturates when the group dropping length becomes large and dominates the perceived temporal quality. The normalization parameter k decreases as frame rate decreases, which means that the effect from quality fluctuation is more observable at high frame rates. In this manner, the normalization parameter k can be used to tune the sensitivity of the metric to more effectively simulate the human visual response.

In addition, the jerkiness of each shot can be obtained by estimating the mean with TQF weighting. In this case, JNJ metric unit 32 can calculate the overall jerkiness of the input video sequence by simply taking the average jerkiness of each shot. As various motion models are applied to each shot, the average of all shots does not necessarily require further weighting.

JNJ metric unit 32 may operate in the pixel mode, rather than the bitstream mode, when the bitstream information is not available. In the pixel mode, it is typical that the YUV (luminance, chrominance 1, chrominance 2) output of the video decoder is available. The basic process for determining the JNJ metric in the pixel mode is similar to that described above for the bitstream mode. However, the input information is different.

Because most decoders duplicate the last frame before frame dropping occurs, the pixel similarity of each frame can be used to determine the location of dropped frames. For example, if a frame is repeated five times, it is apparent that four consecutive frames have been dropped. Repetition can be detected by the gap between consecutive time stamps for each frame and/or analysis of the similarity of the frames.

As the similarity between duplicated frames reaches a threshold, JNJ metric unit 32 is able to estimate which frames were lost. JNJ metric unit 32 may use the same or similar pixel information for shot boundary detection as it uses for frame dropping estimation. As shot transfer occurs during two consecutive shots, for example, the pixel similarity drops to a very low value. When the pixel similarity between successive frames drops below a predetermined threshold, JNJ metric unit 32 determines the presence of a shot boundary.

For motion activity, JNJ metric unit 32 may adopt a normalized pixel difference, e.g., as described in D. Tian, L. Shen and Z. Yao, "Motion Activity Based Wireless Video Quality Perceptual Metric" Proc. IEEE ISIMP, 2006, and S. Jeannin and A. Divakaran, "MPEG-7 Visual Motion Descriptors," IEEE transaction on Circuit and System for Video Technology, 2001. Normalized pixel difference is a reliable indicator of motion activity. After all the information from the pixels has been extracted with appropriate normalization, JNJ metric unit 32 may apply motion mapping, weight estimation and temporal fusion substantially as described above with respect to the bitstream mode.

The various components depicted in FIG. 2 may be formed in a variety of ways, as discrete functional modules or as a monolithic module that encompasses the functionality ascribed herein to each illustrated module. In any event, the various components of video encoding system 44 may be realized in hardware, software, firmware, or a combination thereof. For example, such components may operate as software processes executing on one or more microprocessors or digital signal processors (DSPs), one or more application specific integrated circuits (ASICs), one or more field programmable gate arrays (FPGAs), or other equivalent integrated or discrete logic circuitry.

Figure 3:
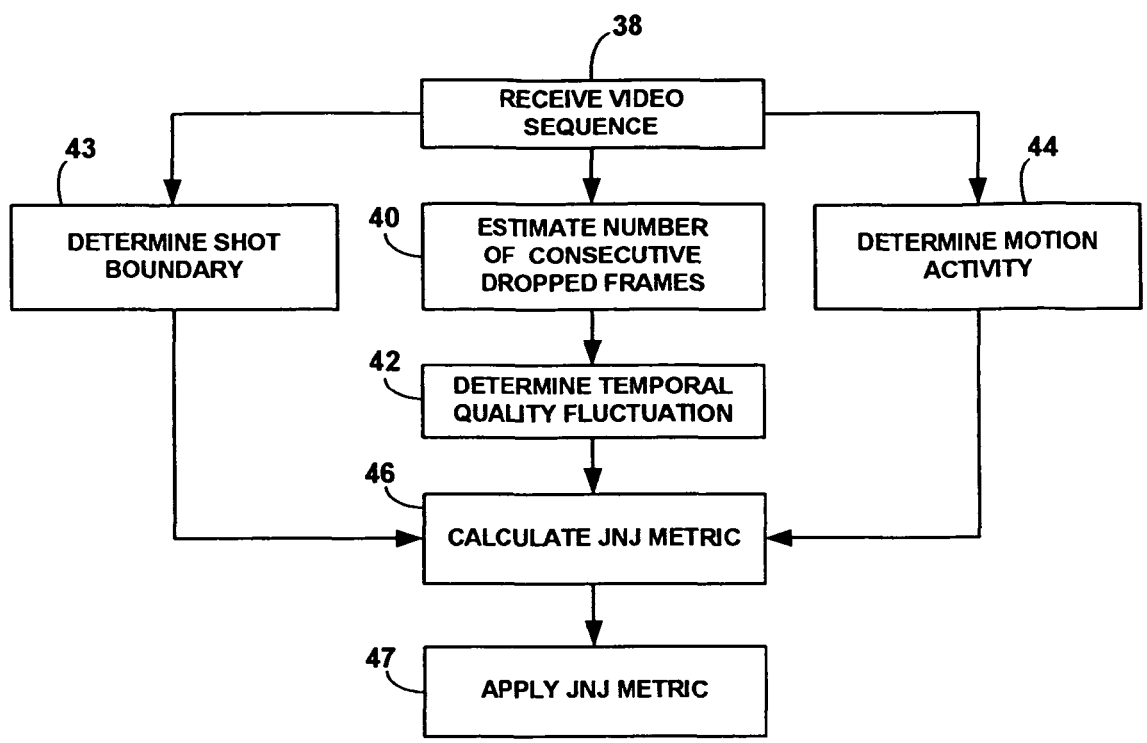
FIG. 3 is flow diagram illustrating operation of the JNJ metric unit of FIG. 2.

FIG. 3 is flow diagram illustrating operation of the temporal quality metric unit of FIG. 2. As shown in FIG. 3, upon receiving a video sequence (38), JNJ metric unit 32 estimates the number of consecutive dropped frames (40), i.e., the group dropping length, determines temporal quality fluctuation (42), determines a shot boundary (43), and determines motion activity (44). Based on the temporal quality fluctuation, shot boundary and motion activity, JNJ metric unit 32 calculates the jerkiness (46), and applies the JNJ metric (47), e.g., for analysis, decoding control, or encoding control.

For example, the output of JNJ metric unit 32 may be used to enhance temporal quality in subsequently encoded and decoded video frames. Notably, instead of estimating jerkiness based solely on frame rate or motion activity, JNJ metric unit 32 combines the number of consecutively dropped frames with temporal quality fluctuation and motion activity to better correlate with the actual human visual response. In this manner, the resulting JNJ metric produces a more effective measure of actual viewer perception of temporal discontinuity.

Figure 4:
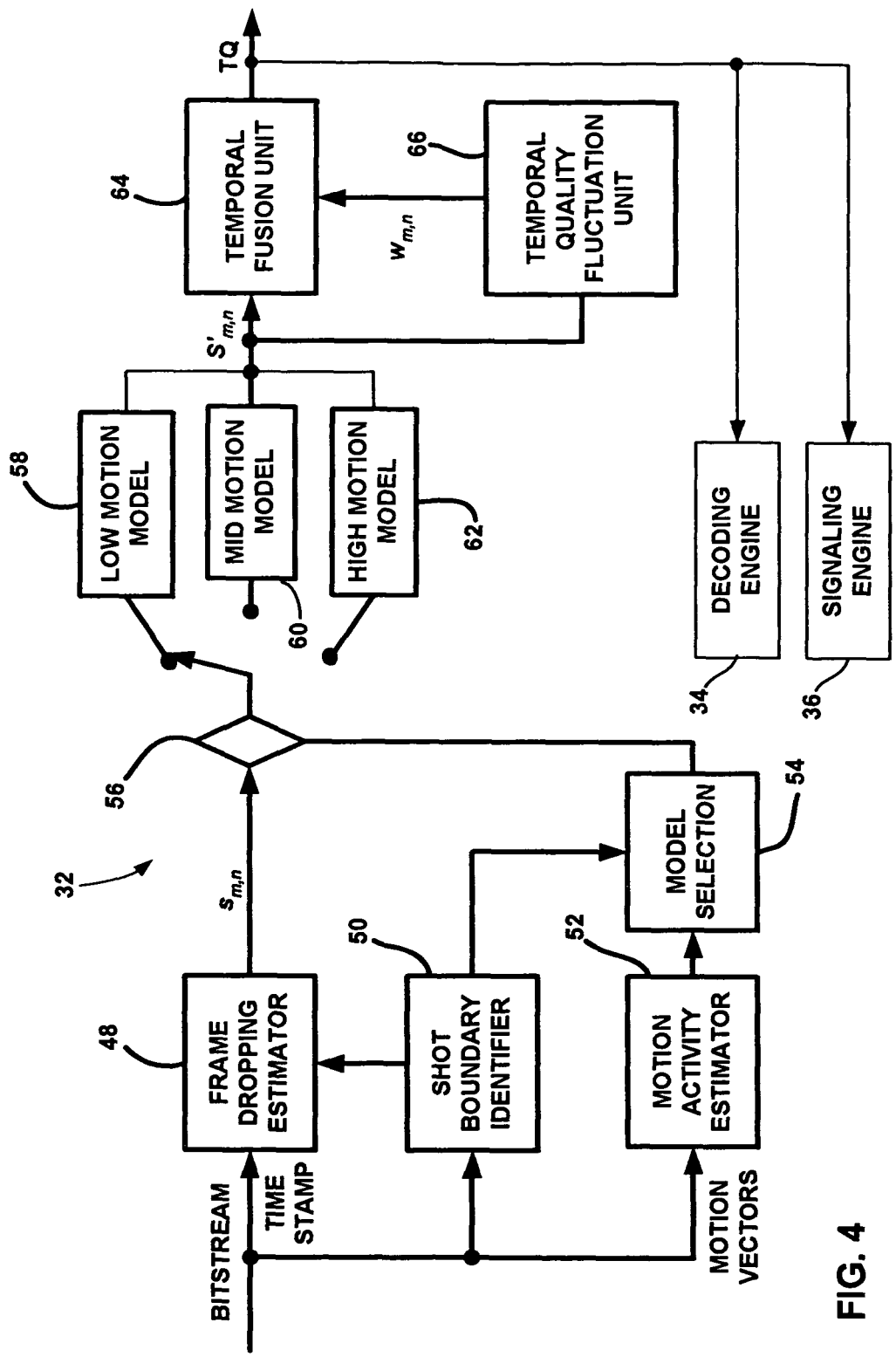
FIG. 4 is a block diagram illustrating example components of the JNJ metric unit of FIG. 2.

FIG. 4 is a block diagram illustrating example components of the JNJ metric unit 32 of FIG. 2. Also, the process for calculating the JNJ metric will be described in greater detail with reference to the various components of FIG. 4. As shown in FIG. 4, JNJ metric unit 32 includes a frame dropping estimator 48, shot boundary identifier 50, motion activity estimator 52, and model selection unit 54. A selection module 56 applies the output of frame dropping estimator 48 to one of three different motion models, i.e., low motion model 58, mid motion model 60 and high motion model 62, based on the output of model selection unit 54. Temporal quality fluctuation (TQF) unit 66 applies a TQF function to the output of the selected motion model 58, 60, 62. Temporal fusion unit 64 receives the output of the selected motion model and the output of TQF unit 66, and produces the jerkiness report.

In the example of FIG. 4, frame dropping estimator 48 receives the video bitstream and analyzes the time stamps recorded in each frame of the bitstream. Using the time stamps, frame dropping estimator 48 determines the time interval between successive undropped frames. If several consecutive frames are dropped, the time stamps for several received frames will be identical due to duplication and repetition of the last undropped frame by the decoder.

If the time stamp between frames is a fixed or determinable value, representing a unit step, frame dropping estimator 48 is able to determine the time interval between successive undropped frames, and hence the group dropping length, i.e., the number of consecutively dropped frames within a video sequence. Alternatively, frame dropping estimator 48 may count the number of times a particular frame is repeated.

Based on the group dropping length, frame dropping estimator 48 produces a frame dropping severity value $s_{m,n}$. The frame dropping severity value may be a function of the group dropping length for a single dropping group, or group dropping lengths for multiple dropping groups.

Shot boundary identifier 50 determines whether a frame transition represents a shot boundary, i.e., a change from one scene to another scene. For example, shot boundary identifier 50 may analyze mode decision information in the received video bitstream to identify a transition from one shot to another. In particular, shot boundary identifier 50 may analyze the incoming video bitstream to identify changes from Inter (P or B) coding to Intra (I) coding.

When a shot changes in terms of scenery, the resulting content change ordinarily will require more Intra coding of at least the first frame in the shot, whereas the remainder of the frames will tend to be Inter-coded. Nevertheless, the amount of Intra coded macro blocks is still less then the Intra frames. Hence, shot boundary identifier 50 may identify shot boundaries by thresholding the amount of Intra coded macro blocks with upper and lower thresholds. If the amount of Intra-coded macro blocks is above a given threshold, for example, the frame including the macro blocks may be identified as residing on a shot boundary.

In the example of FIG. 4, shot boundary identifier 50 provides the boundary identification to frame dropping estimator 48 and decision mode unit 54. Frame dropping estimator 48 uses the shot boundary identification from shot boundary identifier 50 to estimate the dropping severity within each shot. A video sequence may have multiple shots. While estimating the jerkiness, it is important to track the frame dropping severity of each shot separately because different scenes usually introduce different jerky impact. Therefore, carrying the frame dropping length from shot to shot would be misleading. Frame dropping estimator 48 resets the group dropping length when a new shot is identified.

Hence, multiple groups of dropping severity may be estimated for a sequence having multiple shots. Moreover, as will be described in greater detail, multiple group dropping lengths may be estimated within a single shot. In particular, a single shot may have more than one span of consecutively dropped frames. In addition, the dropping of a large number of consecutive frames is more noticeable to the user than the dropping of a small number of consecutive frames or the dropping of single frames on a non-consecutive basis over the course of a shot.

Motion activity estimator 52 receives motion vectors from the frames in the received video bitstream. In general, a motion vector points from a video block in one frame to a substantially similar or identical video block in another frame, providing an indication of motion. Motion activity estimator 52 may determine the general level of motion activity within a given frame based on the average magnitude of motion vectors in the frame. Using the estimated motion activity level from motion activity estimator 52, model selection unit 54 selectively applies the frame dropping severity value $s_{m,n}$ to one of low motion model 58, mid motion model 60 and high motion model 62 via selector 56. In particular, the selected motion model maps the frame dropping severity value $s_{m,n}$ produced by frame dropping estimator 48 into motion model mapping 58, 60, 62. The output of the selected model 58, 60, 62 is a frame rate-based estimation of dropping severity $s'_{m,n}$.

As indicated by their names, low motion model 58, mid motion model 60, and high motion model 62 are applied when motion activity estimator 52 estimates that motion within a frame is low, medium, or high, respectively. Although three different motion models are shown in the example of FIG. 4, additional motion models may be provided for additional levels of motion activity. Each motion model 58, 60, 62 applies a respective mapping of frame dropping severity value $s_{m,n}$ to a motion-mapped frame dropping severity value $s'_{m,n}$. In this manner, the temporal quality metric relies not only on the number of consecutive dropped frames, but also motion activity.

Model selection unit 54 also receives the output of shot boundary identifier 50. By tracking shot boundaries, model selection unit 54 is able to distinguish high motion activity within a given frame from the false appearance of high motion activity due to a scene change between shots. Video frames with similar content usually have similar motion activity. In order to accurately estimate jerkiness, the "correct" level of motion activity should be estimated. Model selection unit 54 uses shot boundary indications from shot boundary identifier 50 to eliminate or appropriately weight motion activity caused by a scene change.

Figure 5:
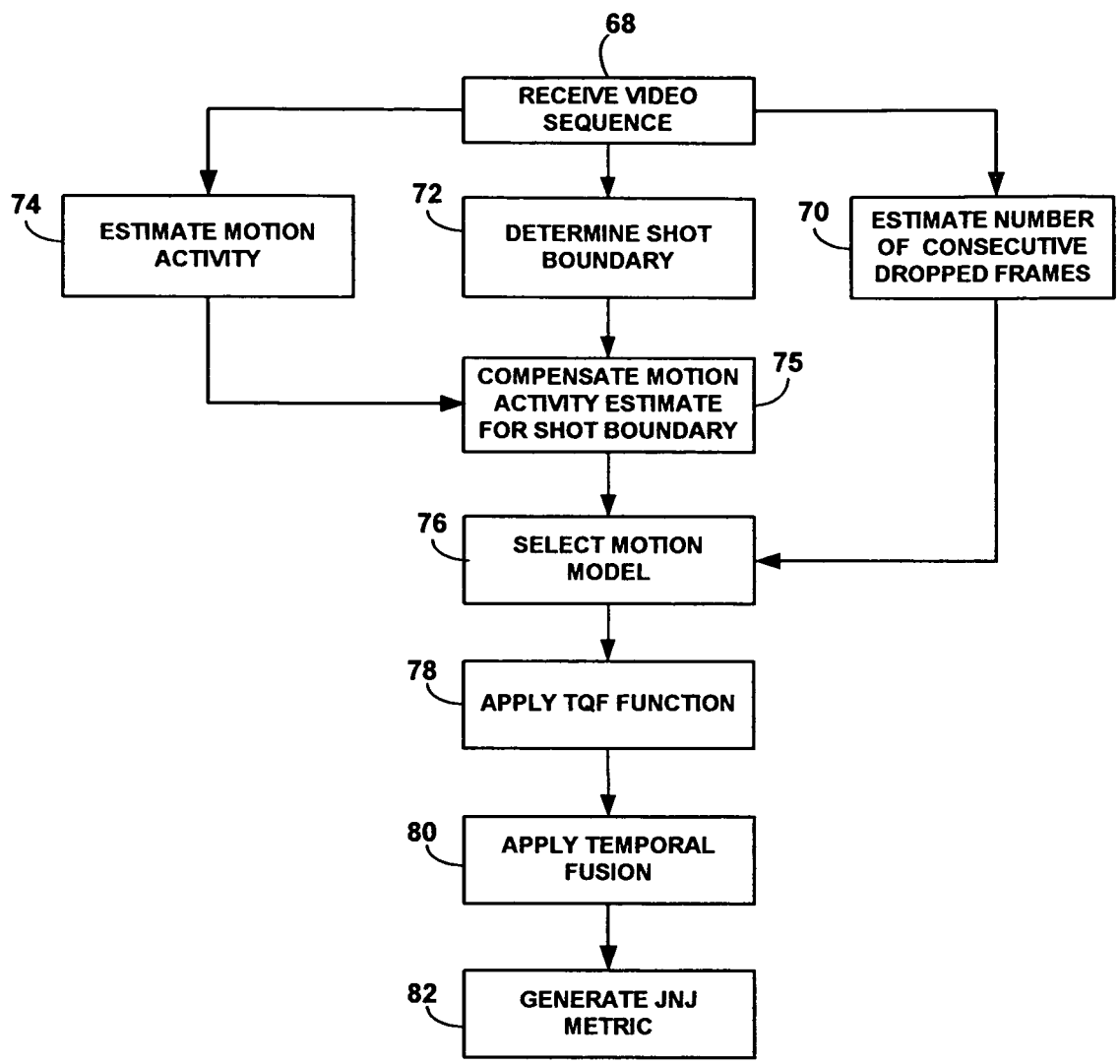
FIG. 5 is a flow diagram illustrating operation of the JNJ metric unit of FIG. 4 in greater detail.

FIG. 5 is a flow diagram illustrating operation of the temporal quality metric unit of FIG. 4 in greater detail. As shown in FIG. 5, frame dropping estimator 48, shot boundary identifier 50 and motion activity estimator 52 receive a video sequence (68), which may be a video bitstream, as shown in FIG. 4, or video pixels resulting from decoding of a video sequence. Frame dropping estimator 48 extracts the time stamps from the bitstreams in the video sequence. Based on time stamp differences, frame dropping estimator 48 estimates the number of consecutively dropped frames (70), and outputs the frame dropping severity value $s_{m,n}$. Shot boundary identifier 50 analyzes the similarity of video frames and/or coding mode changes, i.e., Intra or Inter, to determine shot boundaries (72).

Motion activity estimator 52 estimates the motion activity (74). In particular, motion activity estimator 52 analyzes motion vectors from the video sequence to estimate motion activity (74) for selection of one of the motion models 58, 60, 62. Model selection unit 54 receives an indication of identified shot boundaries from shot boundary identifier 50 to compensate the motion activity output of motion activity estimator 52 (75). In particular, model selection unit 54 distinguishes actual high motion activity resulting from steady state frame content from apparent high motion activity that results from a scene change associated with a shot boundary. As mentioned above, however, shot boundary identification is used to compensate the motion activity so that frame-to-frame shot changes are not misinterpreted as high motion. Using the compensated motion activity, model selection unit 54 selects one of motion models 58, 60, 62 (i.e., Low, Mid, High) (76).

The selected motion model 58, 60, 62 maps the frame dropping length to a motion-mapped frame dropping severity $s'_{m,n}$. The motion-mapped frame mapping length $s'_{m,n}$ is received by temporal fusion unit 64 and temporal quality fluctuation (TQF) unit 66. TQF unit 66 applies the TQF function to the received motion-mapped frame mapping length $s'_{m,n}$ (78) to produce a TQF weight $w_{m,n}$ that represents the amount of temporal quality fluctuation among successive frames, as perceived by a human viewer. Using the TQF weight $w_{m,n}$ and the motion-mapped frame dropping severity value $s'_{m,n}$, temporal fusion unit 64 applies temporal fusion (80) to produce the jerkiness (JNJ) metric as its output (82). The JNJ metric may be used for analysis or feedback control of encoding, decoding or other video processing.

Figure 6:
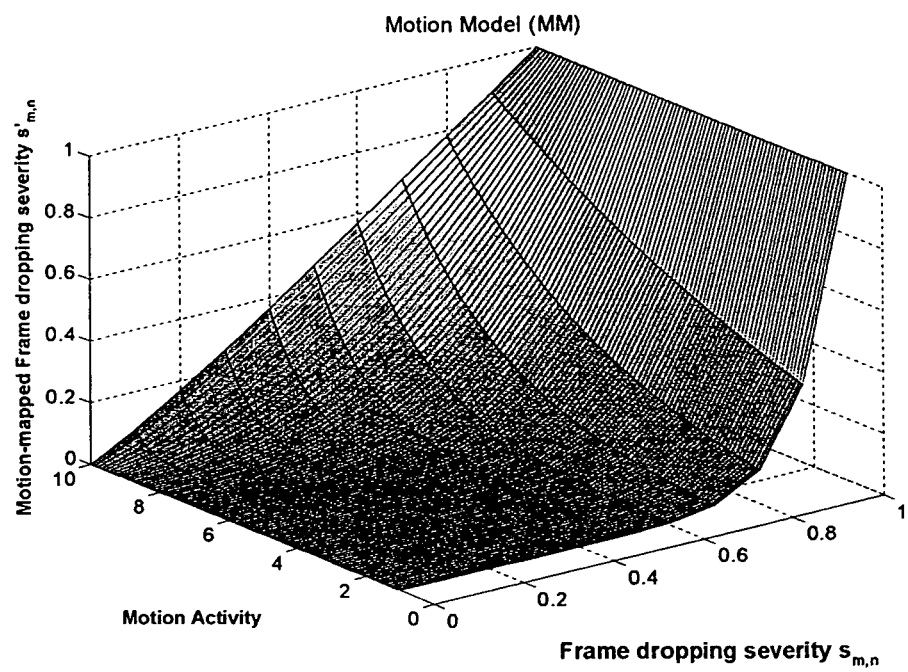
FIG. 6 is a three-dimensional graph illustrating a motion model, constructed as a function of motion activity and frame dropping severity, for use by a JNJ metric unit.

FIG. 6 is a three-dimensional graph illustrating a motion model (MM), constructed as a function of motion activity and frame dropping severity $s_{m,n}$, for use by a temporal quality metric unit. As shown in FIG. 6, the graph maps motion activity versus frame dropping severity $s_{m,n}$ to a motion-mapped frame dropping severity value $s'_{m,n}$. In the example of FIG. 4, three discrete motion mapping models 58, 60, 62 are shown for purposes of illustration. However, the use of a fixed number of motion mapping models is optional, and may vary according to design considerations. Accordingly, the motion mapping illustrated in FIG. 6 may be represented in practice by a relatively large or small number of motion mapping models, depending on available computing power, memory and other design considerations.

The graph of FIG. 6 shows that a combination of motion activity $ma_{m,n}$ and frame dropping severity value $s_{m,n}$ results in a scaling of the frame dropping severity value $s_{m,n}$ to produce a motion-mapped frame dropping severity value $s'_{m,n}$. In general, for high motion activity values $ma_{m,n}$, the motion-mapped frame dropping severity value $s'_{m,n}$ tends to track the frame dropping severity value $s_{m,n}$. For smaller motion activity values $ma_{m,n}$, the motion-mapped frame dropping severity value $s'_{m,n}$ is reduced relative to the frame dropping severity value $s_{m,n}$, unless the frame dropping severity value $s_{m,n}$ is high. A function that yields the motion-mapped frame dropping severity value $s'_{m,n}$ will be described in greater detail below.

Figure 7:
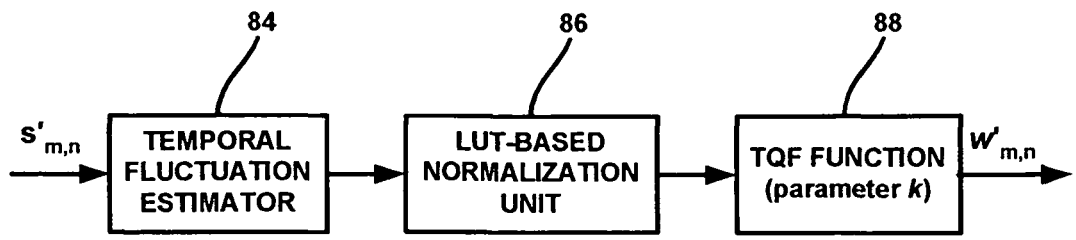
FIG. 7 is a block diagram illustrating example components of a temporal quality fluctuation (TQF) unit for operation with a JNJ metric unit.

FIG. 7 is a block diagram illustrating example components of a temporal quality fluctuation (TQF) unit 66 for operation with a temporal quality metric unit 32. As shown in FIG. 7, the functional components of TQF unit 66 are represented as a temporal fluctuation estimator 84 that receives the motion-mapped frame dropping severity value $s'_{m,n}$, a LUT-based normalization unit 86, and a TQF function unit 88 that applies a parameter k to produce the TQF output $w'_{m,n}$.

Temporal fluctuation estimator 84 calculates temporal fluctuation over a series of frame dropping severity values and produces a temporal fluctuation estimate $tf_{m,n}$. LUT-based normalization unit 86 normalizes the temporal fluctuation estimate $tf_{m,n}$ based on an upper bound (UB) and lower bound (UB) of applicable frame rate over the series of dropped frames to produce a normalized temporal fluctuation estimate $tf'_{m,n}$. TQF function unit 88 applies the TQF function to map local temporal activity into a TQF output weight $w'_{m,n}$ associated with temporal quality.

Figure 8:
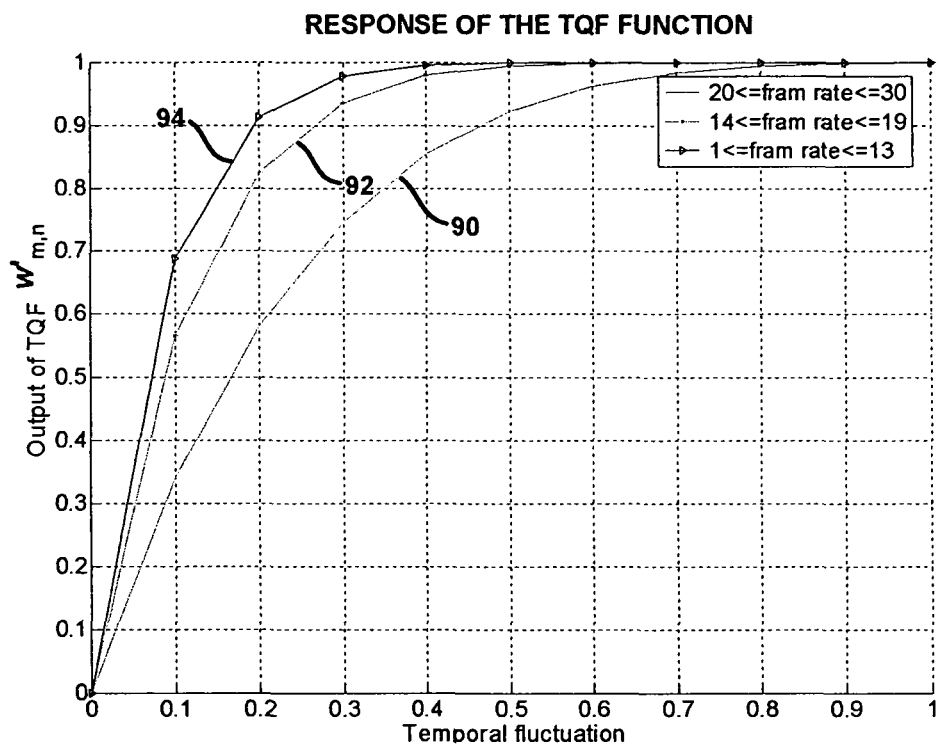
FIG. 8 is a graph illustrating the response of an exemplary TQF function implemented by the TQF unit of FIG. 7.

FIG. 8 is a graph illustrating the response of an exemplary TQF function implemented by the TQF unit 88 of FIG. 7. The graph of FIG. 8 plots temporal fluctuation on the horizontal axis versus TQF output weight $w'_{m,n}$ on the vertical axis, and includes three curves 90, 92, 94 corresponding to different frame rates. In the example of FIG. 8, for frame rates between 20 and 30 frames per second, TQF function unit 88 uses curve 90 to map temporal fluctuation to TQF output $w'_{m,n}$. For frame rates between 14 and 19 frames per second, TQF function unit 88 uses curve 92. For frame rates between 1 and 13 frames per second, TQF function unit uses curve 94.

For higher frame rates, the TQF function generally reduces the TQF output weight $w'_{m,n}$ as higher frame rates tend to alleviate perception of temporal discontinuities. For medium frame frames, curve 92 produces higher TQF output weights $w'_{m,n}$ over the range of estimated temporal fluctuation produced by temporal fluctuation estimator 84. According to curve 94, TQF output weights $w'_{m,n}$ are even higher for very low temporal fluctuation, which are most likely to cause perception of substantial temporal quality fluctuation by the human viewer. Temporal fusion unit 64 applies TQF output weight $w'_{m,n}$ to produce the JNJ metric output.

Figure 9:
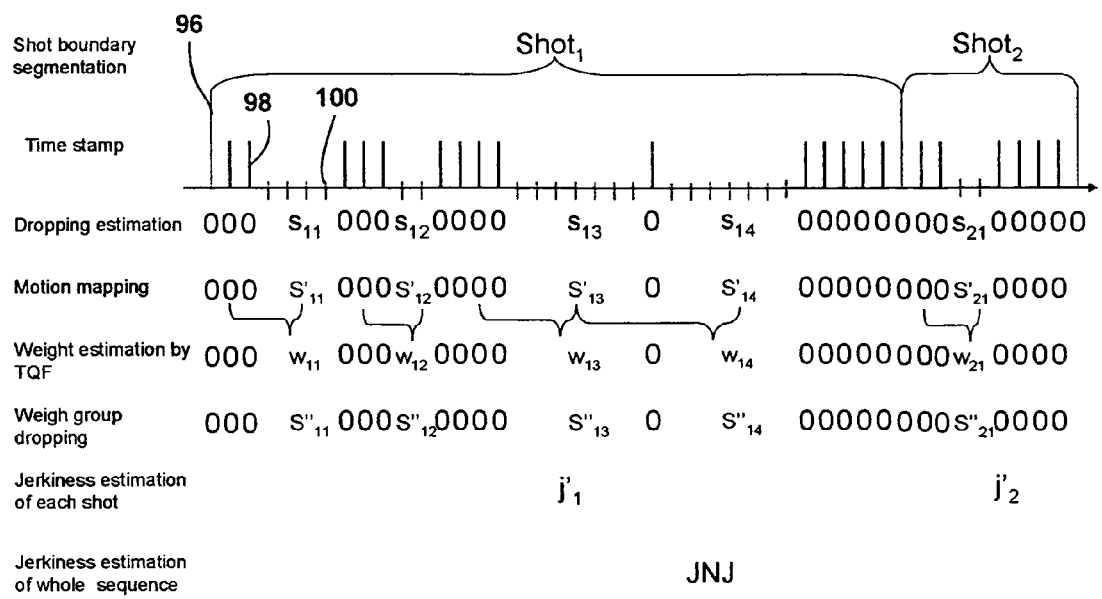
FIG. 9 is a diagram illustrating estimation of a JNJ metric based on frame group dropping length, motion activity and temporal quality fluctuation.

FIG. 9 is a diagram illustrating estimation of a temporal quality metric based on frame group dropping severity $s_{m,n}$, motion activity $ma_{m,n}$ and temporal quality fluctuation $w_{m,n}$. In the diagram of FIG. 9, JNJ metric unit 32 receives multiple video frames in a video sequence. Longer height vertical lines 96 represent video frames that coincide with shot boundaries, and medium height vertical lines 98 represent normal video frames presenting original, non-duplicated content. Shorter height vertical lines 100 represent dropped video frames. The dropped video frames may be replaced by duplicate content from a frame that was received prior to frame dropping. As a result, the dropped video frames ordinarily will have a time stamp that is the same as the previous duplicated frame, and therefore reveals frame dropping.

The number of duplicated frames, i.e., the frame group dropping length, can be determined, for example, by the number of duplicated frames received in succession, or the difference in time stamps between a frame received prior to dropping and the next frame received with a different time stamp. In the example of FIG. 9, dropping estimation tracks instances of dropped frames by shot and occurrence within a shot. In particular, the frame dropping severity value $s_{m,n}$ carries an index m that identifies the shot, and an index n that identifies the order of the pertinent frame dropping group within the shot. Hence, the frame dropping severity value $s_{11}$ refers to the first instance of frame dropping with the first shot, $Shot_1$. Likewise, frame dropping severity values $s_{12}$, $s_{13}$ and $s_{14}$ refer to the second, third and fourth instances, respectively, of frame dropping within the first shot, $Shot_1$. The second shot, $Shot_2$, includes a single occurrence $s_{21}$ of frame dropping.

Each frame dropping severity value $s_{m,n}$ has a value that is a function of the difference between time stamps associated with the dropped frames. In one embodiment, for example, the frame dropping severity value $s_{m,n}$ may be represented as follows:

$$s_{m,n} = \frac{1}{R-1}\left[\frac{|t_{m,n+1} - t_{m,n}|}{T} - 1\right] \quad (1)$$

where m is the index of shots, n is the index of group dropping, T is the time interval between each frame, $t_{m,n-1}$, is the time stamp associated with a frame following a dropped group of frames, and $t_{m,n}$ is the time stamp associated with a frame preceding the dropped group of frames. In operation, frame dropping estimator 48 (FIG. 4) applies equation (1) to compute the estimate frame dropping severity value s for a video sequence.

Subtraction of time stamp $t_{m,n}$ from time stamp $t_{m,n+1}$ produces a difference value that, when divided by the time interval per frame T, indicates the number of frames dropped in a group, i.e., the group dropping length for the particular dropping group under evaluation. The value 1 is subtracted from this difference value, and the result is divided by R−1 to yield a normalized frame dropping severity value $s_{m,n}$. The value R−1 is equivalent to the applicable maximum frame rate minus one frame, and is used to normalize the frame dropping severity value across different frame rates. If the frame rate is 30, for example, the value R−1 is equal to 29, and the above equation (1) appears as follows:

$$s_{m,n} = \frac{1}{29}\left[\frac{|t_{m,n+1} - t_{m,n}|}{T} - 1\right] \quad (2)$$

To calculate the frame dropping severity value s for a particular shot m, group dropping lengths can be calculated for all dropping groups in the shot, per equation (1) above, and summed to produce an overall severity value for the shot. In turn, to calculate the frame dropping severity value s for an overall video sequence, the dropping severity values for each shot in the sequence can be summed.

For motion mapping, motion activity estimator 52 (FIG. 4) receives motion vectors for the frames in the video sequence, and generates motion activity values $ma_{m,n}$, where m is the shot index, and n is the group dropping index. Model selection unit 54 (FIG. 4) selects respective models 58, 60, 62 for application of motion mapping to produce successive motion-mapped frame dropping severity values $s'_{m,n}$. As shown in FIG. 9, for example, the selected motion models 58, 60, 62 map dropping severity values $s_{11}$, $s_{12}$, $s_{13}$ and $s_{14}$ from $Shot_1$ to motion-mapped dropping severity values $s'_{11}$, $s'_{12}$, $s'_{13}$, $s'_{14}$, and map dropping severity value $s_{21}$ from $Shot_2$ to motion-mapped dropping severity value $s'_{21}$.

A selected motion model may map the dropping severity values $s_{m,n}$ to dropping severity values $s'_{m,n}$ using the following equation:

$$s'_{m,n} = MM(s_{m,n}, ma_{m,n}) \quad (3)$$

where MM is a set of predefined motion models such as motion models 58, 60, 62 in FIG. 4, and ma is the motion activity between $t_{m,n-1}$ and $t_{m,n}$, which is normalized with 1-10. In an example embodiment, equation (3) may be configured as follows:

$$s'_{m,n} = MM(s_{m,n}, ma_{m,n}) = \gamma\lfloor -1(1-s_{m,s}^{11.5-ma_{m,n}})+1\rfloor \quad (4)$$

where
 $\gamma = 1$, when $ma_{m,n} \geq th$,
 $\gamma = 0$, when $ma_{m,n} \leq th$, and
 th is a motion activity threshold.

The output of the selected motion model 58, 60, 62 is the motion-mapped dropping severity value $s'_{m,n}$, which is provided to temporal fusion unit 64 and TQF unit 66.

TQF function unit 66 generates a TQF weight based on the dropping severity value $s'_{m,n}$ produced by the selected motion model 58, 60, 62. The TQF weight represents temporal quality fluctuation among the frames in the video sequence, and may be calculated according to the following equation:

$$w_{m,n} = 1 + \kappa \cdot TQF\left[\left(s'_{m,n} - \frac{1}{I}\sum_{i=1}^{I} s'_{m,n-1}\right)^2\right] \quad (5)$$

where I is the size of a window used by TQF function unit 66 to look backward over a series of frames in the video sequence, TQF is a function that maps the local temporal activity into the TQF weight, and the value K is a normalization value that generally tracks the sensitivity of the human visual response. The size I of the window, which may be fixed or variable, specifies the number of frames to be evaluated for estimation of TQF. TQF function unit 66 produces a TQF weight $w_{m,n}$ for the motion-mapped dropping severity value $s_{m,n}$ calculated for each frame dropping group. In the example of FIG. 9, TQF function unit 66 produces TQF weights $w_{11}$, $w_{12}$, $w_{13}$ and $w_{14}$ for motion-mapped dropping severity values $s'_{11}$, $s'_{12}$, $s'_{13}$, and $s'_{14}$ in $Shot_1$, and weight $w_{21}$ for motion-mapped dropping severity value $s'_{21}$ in $Shot_2$.

Temporal fusion unit 64 receives the motion-mapped dropping severity values $s'_{m,n}$ and the corresponding TQF weights $w_{m,n}$, and generates the jerkiness report. For example, temporal fusion unit 64 may apply a temporal metric function as follows:

$$JNJ = \frac{1}{MN}\sum_{m=1}^{M}\sum_{n=1}^{N} w_{m,n} \cdot s'_{m,n} \quad (6)$$

where
 N ∈ number of dropping groups, and
 M ∈ number of shots.

As represented by equation (6) above, temporal fusion unit 64 sums the products of each TQF weight $w_{m,n}$ and each motion-mapped dropping severity value over all shots to produce an overall JNJ metric for the video sequence.

Exemplary operation of TQF function unit 66 will be described in greater detail. As discussed above, TQF function unit 66 computes TQF weights according to equation (5), which is reproduced below:

$$w_{m,n} = 1 + \kappa \cdot TQF\left[\left(s'_{m,n} - \frac{1}{I}\sum_{i=1}^{I} s'_{m,n-1}\right)^2\right] \quad (5)$$

With reference to FIG. 7, temporal fluctuation estimation unit 84, LUT-based normalization unit 86 and TQF function 88 generate the TQF weight $w_{m,n}$ based on the motion-mapped dropping severity value $s'_{m,n}$. More particularly, temporal fluctuation estimation unit 84 may calculate an estimated temporal fluctuation as follows:

$$tf_{m,n} = \left[s'_{m,n} - \frac{1}{I}\sum_{i=1}^{I} s'_{m,n-i}\right]^2 \quad (7)$$

Upon calculation of $tf_{m,n}$, normalization unit 86 normalizes the value according to the following equation:

$$tf'm, n = \frac{tfm, n - LB(framerate)}{UB(framerate) - LB(framerate)} \quad (8)$$

where UB represents the upper bound of the applicable frame rate, and LB represents the lower bound of the applicable frame rate.

TQF function unit 88 computes the TQF weight using the $tf'_{m,n}$ result from normalization unit 86, and a value $\psi$ as follows:

$$w_{m,n} = 1 + \kappa\left[1 - \left(1 - \frac{tf'_{m,n}}{1.25}\right)^{\psi}\right] \quad (9)$$

where
 $\psi=5$ when $20 \leq$ frame rate $\leq 30$
 $\psi=10$ while $19 \leq$ frame rate $\leq 14$, and
 $\psi=14$ while $1 \leq$ frame rate $\leq 14$.

TABLE 1 below illustrates the selected value of $\kappa$ for a given tf and frame rate in equation (9). In general, as shown in TABLE 1, the value of $\kappa$ may be selected to be highest for lower values of tf and higher frame rates, and lowest for low frame rates and lower values of tf.

TABLE 1

Value of κ as a Function of Frame Rate and tf

| tf | frame rate | | | | | |
|---|---|---|---|---|---|---|
|  | 30~25 | 24~20 | 19~15 | 14~10 | 9~5 | 4~1 |
| 1~0.66 | 27 | 22 | 18 | 3 | 2.1 | 1 |
| 0.66~0.33 | 19 | 15 | 12 | 2.5 | 1 | 1 |
| 0.33~0 | 9 | 12 | 2 | 2 | 1 | 1 |

In a subjective experiment, several cases with different combination of group-dropping have been generated under the same frame rate. The subjective impact is affected dramatically by different group dropping lengths. In the experiment, three standard video test sequences (container, highway and rugby) were chosen to represent a range of motion activity. Each sequence was down-sampled to various frame rates: 27 frames per second (fps), 15 fps and 10 fps. In addition, several sub-cases with different combinations of group-dropping were generated for each frame rate. This experiment was carried out by fifteen volunteer viewers, which included five expert and ten non-expert viewers.

TABLE 2 below shows the subjective score obtained from the viewers and the JNJ output obtained using the JNJ metric as described in this disclosure, with a frame rate of 23 fps. TABLES 3 and 4 show the subjective score and JNJ metric output for different frames rates, i.e., 15 fps and 10 fps, respectively, and for different group dropping scenarios. The subjective score are normalized to be within 0-1, with higher values indicating more jerkiness and lower values indicating less jerkiness. The JNJ metric was similarly normalized.

TABLE 2

JNJ vs. Subjective Jerkiness - 23 fps

| Dropping Case | Container - 23 fps | | Highway - 23 fps | | Rugby - 23 fps | |
|---|---|---|---|---|---|---|
|  | Subjective Jerkiness | JNJ | Subjective Jerkiness | JNJ | Subjective Jerkiness | JNJ |
| 1 * 7 | 0.06 | 0.02 | 0.08 | 0.04 | 0.1 | 0.06 |
| 3 + 4 | 0.39 | 0.45 | 0.55 | 0.51 | 0.66 | 0.67 |
| 7 | 0.64 | 0.56 | 0.63 | 0.64 | 0.76 | 0.84 |

TABLE 3

JNJ vs. Subjective Jerkiness - 15 fps

| Dropping Case | Container - 15 fps | | Highway - 15 fps | | Rugby - 15 fps | |
|---|---|---|---|---|---|---|
|  | Subjective Jerkiness | JNJ | Subjective Jerkiness | JNJ | Subjective Jerkiness | JNJ |
| 1 * 15 | 0.18 | 0.20 | 0.21 | 0.25 | 0.30 | 0.30 |
| 7 + 8 | 0.73 | 0.77 | 0.81 | 0.83 | 0.89 | 0.88 |
| 15 | 0.78 | 0.81 | 0.86 | 0.87 | 0.93 | 0.92 |

TABLE 4

JNJ vs. Subjective Jerkiness - 10 fps

| Dropping Case | Container - 10 fps | | Highway - 10 fps | | Rugby - 10 fps | |
|---|---|---|---|---|---|---|
|  | Subjective Jerkiness | JNJ | Subjective Jerkiness | JNJ | Subjective Jerkiness | JNJ |
| 2 * 10 | 0.08 | 0.10 | 0.10 | 0.12 | 0.18 | 0.20 |
| 10 + 10 | 0.83 | 0.80 | 0.90 | 0.88 | 0.91 | 0.94 |
| 20 | 0.95 | 0.96 | 1.0 | 1.0 | 1.0 | 1.0 |

In TABLES 2-4, the left-most column shows different sub-cases of frame dropping, represented in the format of a *b or a+b, where group dropping length is represented by a and the total number of dropping groups in a video clip is b. For example, 1*7 means that there are 7 groups with one dropped frame for group. More particularly, one frame is dropped at a time over seven intervals spaced evenly at one second. Likewise 2*10 means that there are ten groups with 2 dropped frames per group.

Alternatively, a and b both represent group dropping length for two different groups. For example, 3+4 means that there are two dropping groups, and that one of the groups has three dropped frames while the other group has four dropped frames. Likewise, 7+8 means that there are two groups with seven and eight dropped frames, respectively, dropped at one second. If the dropping case is 7, as indicated in TABLE 2, there is a single dropping group with a length of seven dropped frames.

From the experimental results of TABLES 2-4, it is apparent that the subjective jerkiness score is dramatically different for different frame dropping sub-cases, even for the same frame rate. The subjective jerkiness score varies widely according to dropping sub-case because abrupt quality fluctuation is very annoying to a viewer. This evidence shows that estimating jerkiness by frame rate is not sufficient. As the frame rate decreases, the effect from quality variation will decrease gradually because the total number of dropped frames begins to dominate the perceived jerkiness.

From the JNJ output shown in TABLES 2-4, it is apparent that the JNJ metric is very well correlated with the subjective scores. Consequently, the JNJ metric described in this disclosure provides a reasonable substitute for subjective evaluation of temporal quality and temporal quality fluctuation.

Instead of estimating jerkiness based solely on frame rate or motion activity, the disclosed temporal quality metric techniques may use the number of consecutive dropped frames, i.e., the group dropping length, as a basic estimation unit. With two different input modes, the techniques described in this disclosure can handle either bitstream or pixel information based on availability. Using group dropping length, more attributes of jerkiness can be captured. With the addition of local quality activity analysis, the disclosed temporal quality metric can successfully capture human sensitivity to quality fluctuation, which can be very important in assessing overall visual temporal quality. Comparison to subjective viewing results show that the disclosed JNJ metric correlates well with the human visual response to temporal quality. Also, jerkiness sensitivity can be adjusted for different degrees of motion activity.

The techniques described in this disclosure may be implemented in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some embodiments, the functionality described herein may be provided within dedicated software modules or hardware units configured for encoding and decoding, or incorporated in a combined video encoder-decoder (CODEC).

When implemented in software, the techniques may be realized in part by a computer readable medium comprising program code or instructions that, when executed by a processor, performs one or more of the functions described above. A computer-readable medium storing such program code or instructions may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any combination of such memory or storage media.

Various embodiments have been described. These and other embodiments are within the scope of the following claims.

The invention claimed is:

1. A method comprising:
   estimating a number of consecutively dropped video frames in a video sequence based on time stamp information associated with frames of the video sequence to produce a frame dropping severity value;
   estimating a level of motion activity within the video sequence based on an average magnitude of motion vectors in each frame of the video sequence;
   generating a temporal quality metric for the video sequence based on the frame dropping severity value, the estimated level of motion activity, and based on temporal quality fluctuation within the video sequence, wherein the temporal quality fluctuation indicates a temporal quality contrast between a current frame of the video sequence and one or more neighboring frames of the video sequence; and
   adjusting one or more encoding or decoding characteristics based on the temporal quality metric to enhance a temporal quality of the video sequence.

2. The method of claim 1, further comprising generating the temporal quality metric for one of a bitstream or pixel information representing the video sequence.

3. The method of claim 1, wherein generating the temporal quality metric further includes:
   mapping the frame dropping severity value to a motion-compensated frame dropping severity value based on the level of motion activity; and
   generating the temporal quality metric based on the motion-compensated frame dropping severity value.

4. The method of claim 3, further comprising:
   generating a temporal quality fluctuation value based on local temporal activity within a window within the video sequence; and
   generating the temporal quality metric based on the motion-compensated frame dropping severity value and the temporal quality fluctuation value.

5. The method of claim 4, further comprising generating the temporal quality fluctuation value based on a normalization value that corresponds to a human response to temporal quality fluctuation at a given frame rate of the video sequence.

6. The method of claim 1, further comprising:
   identifying a boundary between different shots within the video sequence; and
   compensating the estimated level of motion activity in response to the identified shot boundary identification.

7. The method of claim 1, wherein generating the temporal quality metric further includes:
   identifying a boundary between different shots within the video sequence;
   compensating the estimated level of motion activity in response to the identified shot boundary identification;
   mapping the frame dropping severity value to a motion-compensated frame dropping severity value based on the compensated level of motion activity; and
   generating a temporal quality fluctuation value based on local temporal activity within a window within the video sequence; and
   generating the temporal quality metric based on the motion-compensated frame dropping severity value and the temporal quality fluctuation value according to the following equation:

$$JNJ = \frac{1}{MN} \sum_{m=1}^{M} \sum_{n=1}^{N} w_{m,n} \cdot s'_{m,n}$$

where JNJ represents temporal quality, N represents the number of groups, M represents the number of shots, $s'_{m,n}$ represents the mapped frame dropping severity value, and $w_{m,n}$ represents a degree of temporal quality fluctuation.

8. The method of claim 7, further comprising calculating the $w_{m,n}$ value according to the following equation:

$$w_{m,n} = 1 + \kappa \cdot TQF\left[\left(s'_{m,n} - \frac{1}{I}\sum_{i=1}^{I} s'_{m,n-1}\right)^2\right]$$

where TQF is a function representing temporal quality fluctuation and a value κ is a value that varies according to a frame rate of the video sequence.

9. The method of claim 7, further comprising calculating the $w_{m,n}$ value according to the following equation:

$$w_{m,n} = 1 + \kappa\left[1 - \left(1 - \frac{tf'_{m,n}}{1.25}\right)^\psi\right]$$

where $tf_{m,n}$ is a normalized temporal fluctuation estimate, wherein value κ is a value that varies according to a frame rate and the associated $tf'_{m,n}$ of the video sequence and ψ is varied with different frame rate.

10. The method of claim 9, wherein:
ψ=5 when 20≤frame rate≤30
ψ=10 while 19≤frame rate≤14, and
ψ=14 while 1≤frame rate≤14.

11. A device comprising a processor that:
estimates a number of consecutively dropped video frames in a video sequence based on time stamp information associated with frames of the video sequence to produce a frame dropping severity value;
estimates a level of motion activity within the video sequence based on an average magnitude of motion vectors in each frame of the video sequence;
generates a temporal quality metric for the video sequence based on the frame dropping severity value, the estimated level of motion activity, and based on temporal quality fluctuation within the video sequence, wherein the temporal quality fluctuation indicates a temporal quality contrast between a current frame of the video sequence and one or more neighboring frames of the video sequence; and
adjusts one or more encoding or decoding characteristics based on the temporal quality metric to enhance a temporal quality of the video sequence.

12. The device of claim 11, wherein the processor generates the temporal quality metric for one of a bitstream or pixel information representing the video sequence.

13. The device of claim 11, wherein the processor:
maps the frame dropping severity value to a motion-compensated frame dropping severity value based on the level of motion activity; and
generates the temporal quality metric based on the motion-compensated frame dropping severity value.

14. The device of claim 13, wherein the processor generates a temporal quality fluctuation value based on local temporal activity within a window within the video sequence, and generates the temporal quality metric based on the motion-compensated frame dropping severity value and the temporal quality fluctuation value.

15. The device of claim 14, wherein the processor generates the temporal quality fluctuation value based on a normalization value that corresponds to a human response to temporal quality fluctuation at a given frame rate of the video sequence.

16. The device of claim 11, wherein the processor identifies a boundary between different shots within the video sequence, and compensates the estimated level of motion activity in response to the identified shot boundary identification.

17. The device of claim 11, wherein the processor:
identifies a boundary between different shots within the video sequence;
compensates the estimated level of motion activity in response to the identified shot boundary identification;
maps the frame dropping severity value to a motion-compensated frame dropping severity value based on the compensated level of motion activity; and
generates a temporal quality fluctuation value based on local temporal activity within a window within the video sequence; and
generates the temporal quality metric based on the motion-compensated frame dropping severity value and the temporal quality fluctuation value according to the following equation:

$$JNJ = \frac{1}{MN}\sum_{m=1}^{M}\sum_{n=1}^{N} w_{m,n} \cdot s'_{m,n}$$

where JNJ represents temporal quality, N represents the number of groups, M represents the number of shots, $s'_{m,n}$ represents the mapped frame dropping severity value, and $w_{m,n}$ represents a degree of temporal quality fluctuation.

18. The device of claim 17, wherein the processor calculates the $w_{m,n}$ value according to the following equation:

$$w_{m,n} = 1 + \kappa \cdot TQF\left[\left(s'_{m,n} - \frac{1}{I}\sum_{i=1}^{I} s'_{m,n-1}\right)^2\right]$$

where TQF is a function representing temporal quality fluctuation and a value κ is a value that varies according to a frame rate and the associated $tf'_{m,n}$ of the video sequence.

19. The device of claim 17, wherein the processor calculates the $w_{m,n}$ value according to the following equation:

$$w_{m,n} = 1 + \kappa\left[1 - \left(1 - \frac{tf'_{m,n}}{1.25}\right)^\psi\right]$$

where $tf_{m,n}$ is a normalized temporal fluctuation estimate, wherein value κ is a value that varies according to a frame rate and the associated $tf'_{m,n}$ of the video sequence and ψ is varied with different frame rate.

20. A non-transitory computer-readable medium comprising instructions to cause a processor to:
estimate a number of consecutively dropped video frames in a video sequence based on time stamp information associated with frames of the video sequence to produce a frame dropping severity value;
estimate a level of motion activity within the video sequence based on an average magnitude of motion vectors in each frame of the video sequence;

generate a temporal quality metric for the video sequence based on the frame dropping severity value, the estimated level of motion activity, and based on temporal quality fluctuation within the video sequence, wherein the temporal quality fluctuation indicates a temporal quality contrast between a current frame of the video sequence and one or more neighboring frames of the video sequence; and adjust one or more encoding or decoding characteristics based on the temporal quality metric to enhance a temporal quality of the video sequence.

21. The non-transitory computer-readable medium of claim 20, further comprising instructions to cause the processor to generate the temporal quality metric for one of a bitstream or pixel information representing the video sequence.

22. The non-transitory computer-readable medium of claim 20, further comprising instructions to cause the processor to:

map the frame dropping severity value to a motion-compensated frame dropping severity value based on the level of motion activity; and generate the temporal quality metric based on the motion-compensated frame dropping severity value.

23. The non-transitory computer-readable medium of claim 22, further comprising instructions to cause the processor to generate a temporal quality fluctuation value based on local temporal activity within a window within the video sequence, and generate the temporal quality metric based on the motion-compensated frame dropping severity value and the temporal quality fluctuation value.

24. The non-transitory computer-readable medium of claim 23, further comprising instructions to cause the processor to generate the temporal quality fluctuation value based on a normalization value that corresponds to a human response to temporal quality fluctuation at a given frame rate of the video sequence.

25. The non-transitory computer-readable medium of claim 20, further comprising instructions to cause the processor to identify a boundary between different shots within the video sequence, and compensate the estimated level of motion activity in response to the identified shot boundary identification.

26. The non-transitory computer-readable medium of claim of claim 20, wherein the instructions cause the processor to:

identify a boundary between different shots within the video sequence;

compensate the estimated level of motion activity in response to the identified shot boundary identification;

map the frame dropping severity value to a motion-compensated frame dropping severity value based on the compensated level of motion activity; and generate a temporal quality fluctuation value based on local temporal activity within a window within the video sequence; and generate the temporal quality metric based on the motion-compensated frame dropping severity value and the temporal quality fluctuation value according to the following equation:

$$JNJ = \frac{1}{MN}\sum_{m=1}^{M}\sum_{n=1}^{N} w_{m,n} \cdot s'_{m,n}$$

where JNJ represents temporal quality, N represents the number of groups, M represents the number of shots, $s'_{m,n}$ represents the mapped frame dropping severity value, and $w_{m,n}$ represents a degree of temporal quality fluctuation.

27. The non-transitory computer-readable medium of claim 26, wherein the instructions cause the processor to calculate the $w_{m,n}$ value according to the following equation:

$$w_{m,n} = 1 + \kappa \cdot TQF\left[\left(s'_{m,n} - \frac{1}{I}\sum_{i=1}^{I} s'_{m,n-1}\right)^2\right]$$

where TQF is a function representing temporal quality fluctuation and a value $\kappa$ is a value that varies according to a frame rate of the video sequence.

28. The non-transitory computer-readable medium of claim 26, wherein the instructions cause the processor to calculate the $w_{m,n}$ value according to the following equation:

$$w_{m,n} = 1 + \kappa\left[1 - \left(1 - \frac{tf'_{m,n}}{1.25}\right)^{\psi}\right]$$

where $tf'_{m,n}$ is a normalized temporal fluctuation estimate, wherein value $\kappa$ is a value that varies according to a frame rate and the associated $tf'_{m,n}$ of the video sequence and $\psi$ is varied with different frame rate.

29. The non-transitory computer-readable medium of claim 28, wherein:

$\psi=5$ when 20≤frame rate≤30

$\psi=10$ while 19≤frame rate≤14, and $\psi=14$ while 1≤frame rate≤14.

* * * * *